(12) United States Patent
Inamdar et al.

(10) Patent No.: US 10,895,380 B2
(45) Date of Patent: Jan. 19, 2021

(54) FLAMELESS THERMAL OXIDIZER FOR OXIDIZING GASEOUS EFFLUENT STREAMS CONTAINING HYDROGEN GAS

(71) Applicant: LINDE ENGINEERING NORTH AMERICA INC., Blue Bell, PA (US)

(72) Inventors: Shailendra Inamdar, Edison, NJ (US); Eric Predatsch, Conshohocken, PA (US); Gene H. Irrgang, Horsham, PA (US); Steven Korn, Northampton, PA (US)

(73) Assignee: LINDE ENGINEERING NORTH AMERICA INC., Blue Bell, PA (US)

( * ) Notice: Subject to any disclaimer, the term of this patent is extended or adjusted under 35 U.S.C. 154(b) by 0 days.

(21) Appl. No.: 16/272,131

(22) Filed: Feb. 11, 2019

(65) Prior Publication Data

US 2019/0168156 A1 Jun. 6, 2019

Related U.S. Application Data

(62) Division of application No. 15/588,997, filed on May 8, 2017, now Pat. No. 10,272,385.

(Continued)

(51) Int. Cl.
*F23C 99/00* (2006.01)
*F23D 14/62* (2006.01)
(Continued)

(52) U.S. Cl.
CPC ............ *F23C 99/006* (2013.01); *B01D 53/44* (2013.01); *B01D 53/56* (2013.01); *B01D 53/62* (2013.01); *B01F 3/026* (2013.01); *B01F 5/0453* (2013.01); *B01F 5/0463* (2013.01); *B01F 5/0618* (2013.01); *F23D 14/02* (2013.01); *F23D 14/62* (2013.01); *B01D 2257/502* (2013.01); *B01F 2005/0025* (2013.01); *B01F 2005/063* (2013.01); *B01F 2215/0036* (2013.01); *B01J 2208/00* (2013.01);
(Continued)

(58) Field of Classification Search
None
See application file for complete search history.

(56) References Cited

U.S. PATENT DOCUMENTS 3,982,538 A 9/1976 Sharpe
4,177,168 A * 12/1979 Denny ..................... B01J 23/40
502/313

(Continued)

OTHER PUBLICATIONS

European Search Report for EP 17171428, Search Report Completed: Oct. 16, 2017, 6 pgs.

(Continued)

*Primary Examiner* — Sheng H Davis
(74) *Attorney, Agent, or Firm* — Millen White Zelano & Branigan, PC; Brion P. Heaney

(57) ABSTRACT

A method for oxidizing a waste stream having hydrogen therein includes flowing the waste stream with hydrogen into an oxidant stream for mixing the streams in a proportion for providing a mixture below lower flammability limits (LFL), including the LFL of hydrogen; and introducing the mixed streams into a ceramic matrix bed of a flameless thermal oxidizer maintained at a temperature above autoignition temperature of the mixture. A related apparatus is also provided.

15 Claims, 2 Drawing Sheets

Related U.S. Application Data

(60) Provisional application No. 62/337,386, filed on May 17, 2016.

(51) Int. Cl.
  *F23D 14/02* (2006.01)
  *B01D 53/44* (2006.01)
  *B01D 53/56* (2006.01)
  *B01D 53/62* (2006.01)
  *B01F 3/02* (2006.01)
  *B01F 5/04* (2006.01)
  *B01F 5/06* (2006.01)
  *B01F 5/00* (2006.01)

(52) U.S. Cl.
  CPC ............... *F23C 2900/99001* (2013.01); *F23C 2900/9901* (2013.01); *F23G 2208/10* (2013.01); *F23G 2209/141* (2013.01); *Y02E 20/34* (2013.01)

(56) References Cited

U.S. PATENT DOCUMENTS

| | | |
|---|---|---|
| 4,293,298 A | 10/1981 | Bergkvist |
| 4,460,330 A | 7/1984 | Asai et al. |
| 4,823,711 A | 4/1989 | Kroneberger et al. |
| 5,165,884 A | 11/1992 | Martin et al. |
| 5,565,009 A | 10/1996 | Ruhl et al. |
| 6,003,305 A | 12/1999 | Martin et al. |
| 6,015,540 A * | 1/2000 | McAdams ............... B01J 8/001 423/245.3 |
| 6,088,934 A | 7/2000 | Newton |
| 6,257,869 B1 | 7/2001 | Martin et al. |
| 7,704,070 B2 | 4/2010 | Veenstra |
| 2003/0089038 A1 | 5/2003 | Weaver |
| 2003/0096204 A1 | 5/2003 | Hermann et al. |
| 2003/0101651 A1 | 6/2003 | Weedon |
| 2004/0185398 A1 | 9/2004 | Butler |
| 2006/0183064 A1 | 8/2006 | Rost et al. |
| 2009/0056696 A1* | 3/2009 | Munshi ................... F23C 3/002 126/263.01 |
| 2010/0258476 A1* | 10/2010 | Lockhart ............. E21B 41/0064 208/340 |
| 2010/0283991 A1 | 11/2010 | Chrzan et al. |
| 2010/0319355 A1* | 12/2010 | Prabhu ................... F02C 7/224 60/772 |
| 2014/0283812 A1 | 9/2014 | Irrgang et al. |

OTHER PUBLICATIONS

European Search Report for EP 17180065, Search Report Completed: Nov. 3, 2017 and published Jan. 10, 2018, 5 pgs.
European Search Report for EP 17180066, Search Report Completed: Nov. 13, 2017 and published Jan. 10, 2018, 5 pgs.

* cited by examiner

FLAMELESS THERMAL OXIDIZER FOR OXIDIZING GASEOUS EFFLUENT STREAMS CONTAINING HYDROGEN GAS

BACKGROUND OF THE INVENTION

The present embodiments relate to flameless thermal oxidizers (FTO) used to oxidize effluent or waste streams of for example chemical or petrochemical plants, and in particular to FTOs having a fixed matrix bed.

A flameless thermal oxidizer (FTO) is used for flameless oxidation of gaseous effluent (waste) streams, by introducing a mixture of the effluent stream and an oxidizer, typically air, into an FTO vessel containing a fixed matrix bed maintained at temperatures above 1400° F. in a well-defined reaction zone remote from a mixing region. During operation of a known FTO, a mixture of an effluent gaseous stream and an oxidizer is delivered to the fixed matrix bed through a dip tube partially embedded in the matrix such that an oxidation reaction zone, which is flameless, is established in the hot fixed matrix bed. An important difference between an FTO and other known types of combustors, such as burners, combustion chambers using coal or fluidized bed reactors, etc., is that within the FTO the oxidation reaction occurs outside of flammability limits, typically below lower flammability limits (LFL) and thus, there is no flame front or the oxidation is flameless.

A combination of structural features and gaseous mixture controls in the known FTO prevents the oxidation reaction front from propagating upstream through the dip tube, thus making the FTO operationally safe as well as environment friendly. However, current FTO construction and related methods of operation do not offer the safety and environmental benefits in situations where the effluent mixture contains hydrogen gas. Hydrogen gas is extremely reactive, has a high oxidation reaction propagation velocity or flame speed, and when mixed with an oxidizer such as air, has a wide range of lower flammability to upper flammability limits, thus making known FTOs and related operations highly prone to a risk of uncontrolled oxidation reaction this uncontrolled oxidation reaction. This uncontrolled oxidation reaction will develop a flame front along an interior of the dip tube or inside the fixed matrix bed, thus creating conditions which may cause damage to the FTO vessel, violation of environmental permit limits on emission of volatile organic chemicals (VOCs), and/or green-house gases (GHGs).

The current lack of technical knowledge to control the oxidation mixture concentration limits, mixture speed, and reaction zone necessary for effluent streams with hydrogen therein has to date prevented known FTOs from being used as a viable technical solution for such hydrogen laden gaseous streams.

SUMMARY OF THE INVENTION

There is therefore provided a flameless thermal oxidizer (FTO) apparatus for a gaseous stream containing hydrogen, which includes a vessel containing a ceramic matrix bed; and a dip tube extending into the ceramic matrix bed, the dip tube including a first flow path for a first gaseous stream having hydrogen therein, and a second flow path for a second stream having an oxidant therein to be mixed with the first stream for introduction into the ceramic matrix bed.

A method is also provided of combining the first and second streams gradually upon approach to an exit of the dip tube to provide a mixture having a concentration to effectively handle hydrogen containing waste streams in the flameless thermal oxidizer.

There is also provided herein a method for oxidizing a waste stream having hydrogen therein, including flowing the waste stream with hydrogen into an oxidant stream for mixing said streams in a proportion for providing a mixture below lower flammability limits (LFL), including the LFL of hydrogen; and introducing the mixed streams into a ceramic matrix bed of a flameless thermal oxidizer maintained at a temperature above auto-ignition temperature of the mixture.

The mixed streams exiting the dip tube as a mixture, and a safe mixing zone geometry external to the dip tube are controlled to maintain concentration of the mixture below LFL, and a velocity of the mixture above the flame propagation speed prior to flowing over the fixed matrix bed is also maintained above auto-ignition temperature in order to initiate and complete oxidation reaction in the flameless manner.

Other features of the present embodiments are also presented herein and in the remaining claims.

BRIEF DESCRIPTION OF THE DRAWINGS

For a more complete understanding of the present invention, reference may be had to the following description of exemplary embodiments considered in connection with the accompanying drawing Figures, of which.

DETAILED DESCRIPTION OF THE INVENTION

Before explaining the inventive embodiments in detail, it is to be understood that the invention is not limited in its application to the details of construction and arrangement of parts illustrated in the accompanying drawings, if any, since the invention is capable of other embodiments and being practiced or carried out in various ways. Also, it is to be understood that the phraseology or terminology employed herein is for the purpose of description and not of limitation.

In the following description, terms such as a horizontal, upright, vertical, above, below, beneath and the like, are to be used solely for the purpose of clarity illustrating the invention and should not be taken as words of limitation.

This invention has overcome the challenges of controlling a flameless oxidation reaction for effluent streams containing hydrogen.

In general, an FTO apparatus and method embodiments provided herein will control an oxidation zone for an effluent stream with up to 80% hydrogen mole fraction, and to mix the hydrogen containing effluent stream with oxidizer, such as air, or oxygen, at or near the exit of a dip tube proximate the fixed matrix bed in the FTO. Thus, a large volume of a combustible effluent stream and oxidizer mixture within flammability limits is prevented from getting into the dip tube. This is accomplished by using a specially constructed concentric dip tube which provides separate paths, i.e. one for the effluent stream with hydrogen, and another path for the oxidant. An end of the dip tube is constructed to allow mixing of the effluent with hydrogen and the oxidizer proximate an outlet of the dip tube.

The injection of the effluent or waste stream with hydrogen therein and the oxidizer occurs in such a way to prevent the mixture from re-entering the dip tube, thus preventing the mixture from reaching flammability limits within the dip tube. The injection of the effluent stream with hydrogen is tangential to the oxidizer flow, thus preventing concentration build-up closer to the injection point. The dip tube construction provides a spin or rotational movement to the oxidizer flow proximate the mixing zone, thus making the effluent stream with hydrogen disperse quickly. The fixed matrix bed temperature can be adjusted in response to the hydrogen concentration, thus allowing a controlled oxidation reaction zone within the matrix bed.

The present embodiments have been tested in a controlled FTO having up to 80% hydrogen mole fraction in the effluent stream. Alternatively, effluent streams greater than 80% gaseous hydrogen mole fraction can be oxidized by diluting the stream with a different supplemental effluent or fuel gas stream or streams to reduce the hydrogen concentration below the maximum limit for a particular FTO design.

Figure 1:
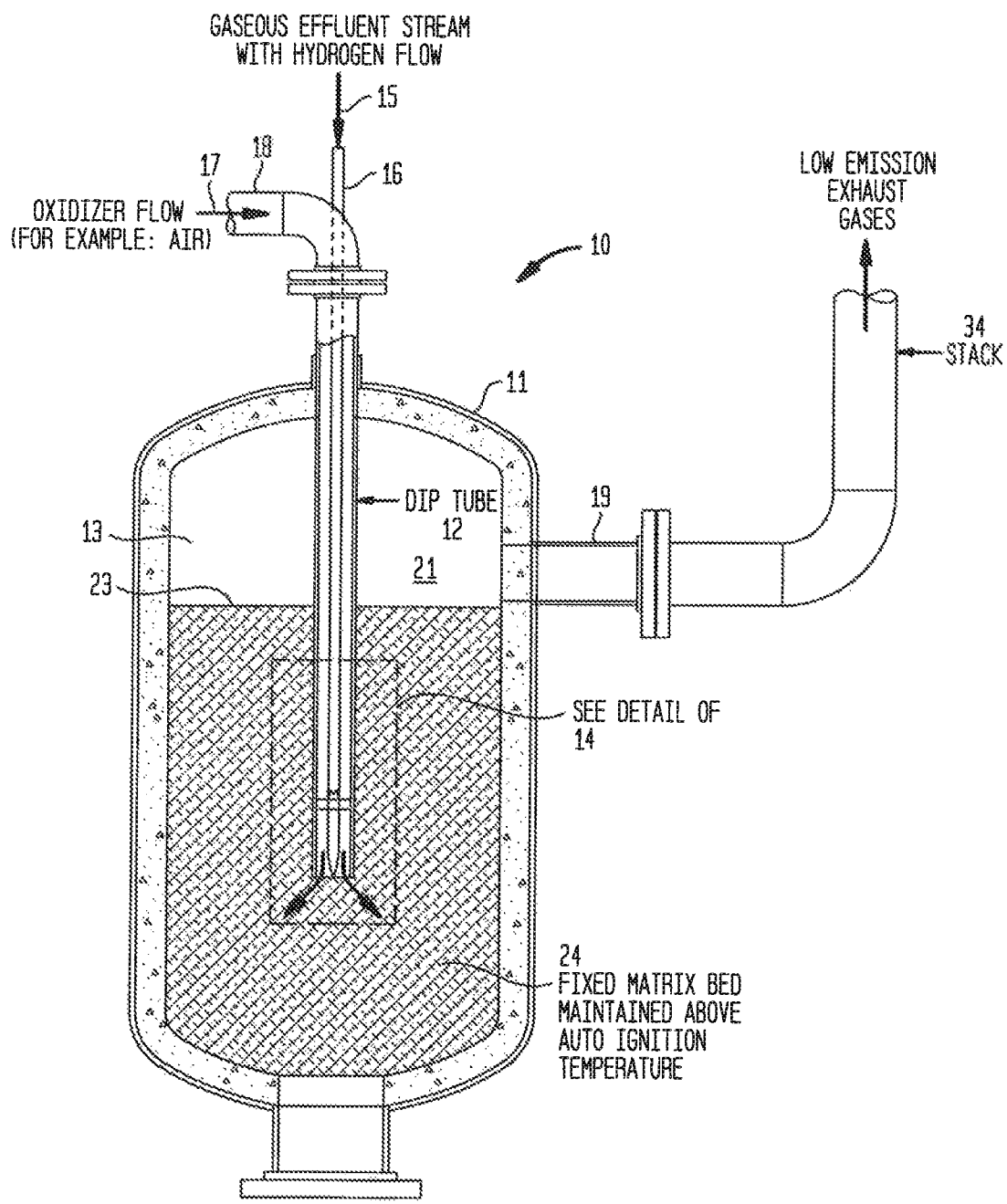
FIG. 1 shows a schematic of a flameless thermal oxidizer (FTO) embodiment according to the present invention.
Figure 2:
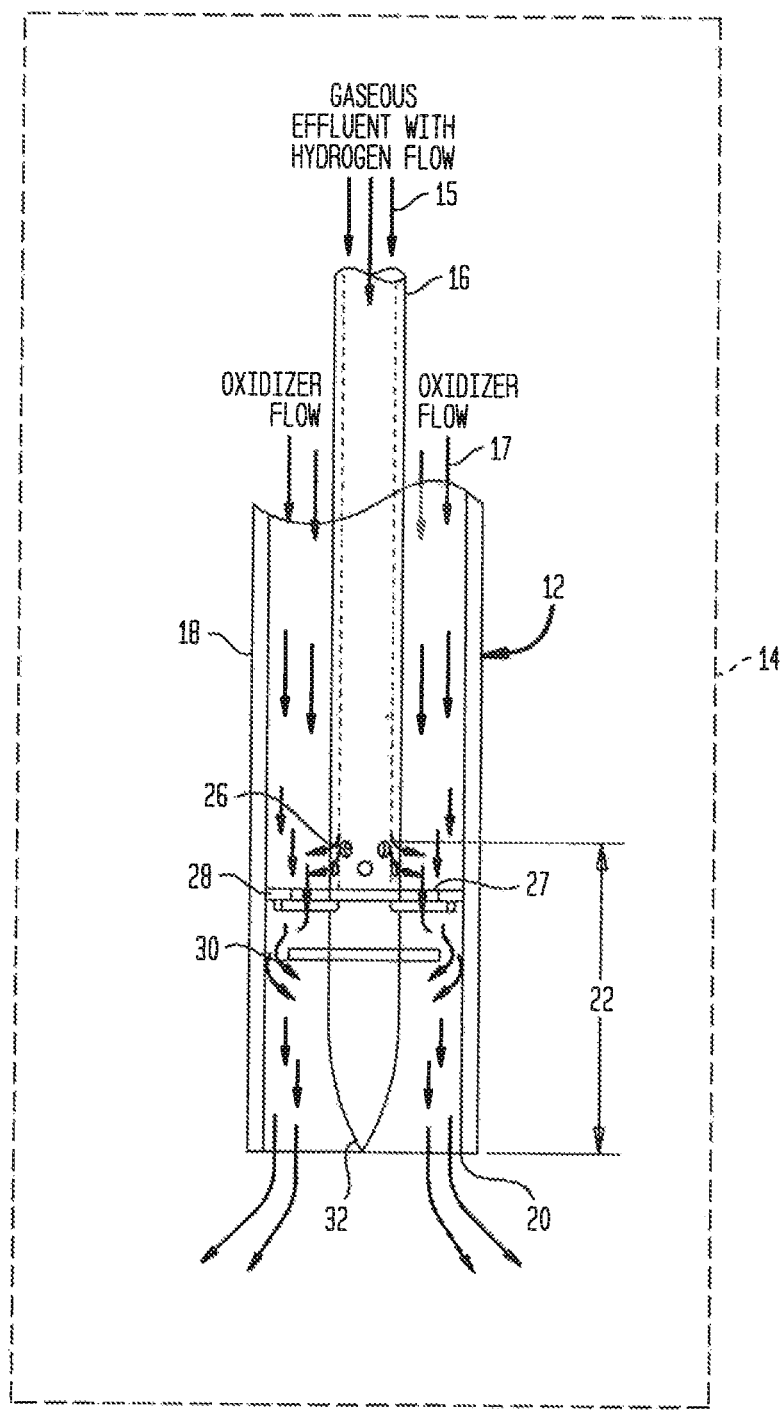
FIG. 2 shows an enlarged portion of a dip tube of the FTO in FIG. 1, The drawings are for the purpose of illustrating the invention and are not intended to be to scale.

In particular and referring to FIGS. 1 and 2, a flameless thermal oxidizer (FTO) of the present embodiments is shown generally at 10. The FTO 10 includes a vessel 11 or container in which a chamber 13 is provided. A dip tube assembly 12 extends into the chamber 13 with a pipe 16 extending along an interior of the dip tube 12 for a purpose described hereinafter. The dip tube assembly 12 includes an exploded or enlarged portion detailed at 14 and shown at FIG. 2.

The dip tube assembly 12 includes a pipe 18 through which the pipe 16 is positioned. The pipe 16 introduces a gaseous effluent stream with hydrogen 15 therein into the assembly. The oxidizer may be for example air, plant air or oxygen. The pipe 18 introduces an oxidizer stream 17 or flow into the dip tube assembly. The merger and mixing of the streams 15, 17 is described hereinafter. The dip tube assembly 12 is provided with an outlet 20 as shown more clearly in FIG. 2.

The FTO 10 also includes an exhaust pipe 19 in fluid communication with a region 21 of the chamber 13 above an upper surface 23 of a matrix bed 24 as shown in FIG. 1. The material of the ceramic matrix bed 24 is specifically chosen for a high specific heat to act as a heat storage device, and rated for design temperature determined by the application. The ceramic matrix bed is non-catalytic, and is primarily a source of ignition for the lean mixture of the streams 15, 17, mixed in a staged concentration which finally produces a mixture at the dip tube exit that is below the lower flammability limit (LFL) and normally cannot produce a flame front.

Referring to FIG. 2, as mentioned above, the dip tube assembly 12 extends into the matrix bed 24. A lower portion of the effluent pipe 16 is provided with at least one and for most applications a plurality of holes 26 or openings. A plate 27 circumscribes an exterior surface of the pipe 16 and is provided with a mixing orifice 28 extending through the plate for the streams 15, 17. The plate 27 is constructed and arranged to be exposed to the streams 15, 17 for same to be mixed as the streams pass through the mixing orifice 28. At a position below the plate 27, there is provided a mixing disc 30 which also circumscribes an exterior surface of the pipe 16 but does not extend radially to an extent sufficient to block the internal passage of the pipe 18. The mixing disc 30 facilitates mixing of the effluent and oxidizer streams 15, 17. A lower most portion of the effluent pipe 16 is sealed and terminates in a nose cone 32.

An exhaust stack 34 is in fluid communication with the exhaust pipe 19 for releasing exhaust gases from the interior region 21 of the vessel 11.

The present embodiments provide separate streams each one of which is in a corresponding separate flow path in the dip tube 12, ie one flow path for a gaseous effluent stream 15 with hydrogen, and another flow path for an oxidizer (oxidant) stream 17 of for example air, oxygen, plant or "dirty" air (unfit for breathing), or any combination of such oxidizers.

Mixing the hydrogen containing gaseous effluent stream 15 with the oxidizer 17 at or near the outlet 20 of dip tube 12 is shown as a mixing zone 22 located proximate to the fixed matrix bed 24. Consequently, a large volume combustible stream mixture containing gaseous effluent with hydrogen and oxidizer is prevented from accumulation within the dip tube 12.

The FTO apparatus 10 also includes at least one and for most applications a plurality of openings 26 constructed to accommodate the available pressure of the gaseous effluent stream with hydrogen 15. The size of each one of the openings 26 is calculated based upon a volume of the gaseous effluent stream 15, and to provide sufficient velocity of that stream 15 to prevent the oxidizer stream 17 from entering (or backing) into the pipe 16 through the openings 26.

An end of dip tube as shown in FIG. 2 includes the mixing orifice 28 which accelerates the oxidizer flow 17 creating lower pressure that draws the mixture of the gaseous effluent containing hydrogen 15 into the oxidizer.

The mixing disc 30 and its positioning within the oxidizer stream 17 provides a spin or rotational turbulence to the oxidizer flow 17 thus making the effluent stream with hydrogen 15 disperse in the oxidizer flow with the enhanced mixing.

The injection of the effluent stream with hydrogen 15 into the oxidizer 17 occurs to prevent the mixture from re-entering the dip tube through the mixing orifice 28 and the mixing disc 30 thus preventing the dip tube 12 from reaching flammability limits.

The injection of the gaseous effluent stream with hydrogen 15 through the openings 26 is tangential to the oxidizer flow 17 thus preventing gaseous effluent with hydrogen from accumulating and build-up of a related concentration in the vicinity of the openings 26.

The nose cone section 32 prevents a stagnant zone for the gaseous effluent and oxidizer mixture from reaching flammability limits.

A temperature of the fixed bed matrix 24 is adjustable in response to the hydrogen concentration in the effluent stream 15 by monitoring combustion products in the exhaust stack 34 and/or the exact hydrogen content in the gaseous effluent stream 15, thus having a controlled "flameless" oxidation reaction zone within the fixed matrix bed 24.

The apparatus 10 and related method have been proven in a controlled FTO test for up to 80% hydrogen mole fraction in the effluent stream 15.

A gaseous effluent stream containing greater than 80% hydrogen mole fraction can be oxidized by diluting the stream with supplemental inert or fuel gas to bring the hydrogen concentration below 80% mole fraction.

Another embodiment of the FTO apparatus includes the ceramic matrix bed at a temperature above auto-ignition temperature of each component of the first gaseous stream having hydrogen therein.

Another embodiment of the FTO apparatus calls for the dip tube including a first pipe having a first sidewall containing the first flow path and including at least one hole therethrough for releasing the first stream from the first flow path; and a second pipe containing the second flow path, the second pipe sized and shaped to receive a portion of the first pipe in the second flow path such that fluid communication is provided to the second stream through the at least one hole.

Another embodiment of the FTO apparatus calls for the dip tube including insulating material at the second pipe for thermally isolating the dip tube from the ceramic matrix bed, and the second pipe is at a temperature below an auto-ignition temperature of each component of the first gaseous stream.

Another embodiment of the FTO apparatus calls for the vessel including a region above the ceramic matrix bed, and an exhaust pipe in fluid communication with the region.

Another embodiment of the FTO apparatus includes the first sidewall of the first pipe being sealed downstream of the at least one hole.

Another embodiment of the FTO apparatus calls for the first sidewall including a plurality of holes sized and arranged along the first sidewall to provide a mixture of the first and second streams at a concentration below flammability limits along the dip tube.

Another embodiment of the FTO apparatus further includes a plate which circumscribes an exterior surface of the first sidewall and is positioned in the second flow path downstream from the at least one hole, the plate including an orifice through which the first and second streams pass to be mixed.

Another embodiment of the FTO apparatus further includes a disc which circumscribes the exterior surface of the first sidewall and is positioned in the second flow path downstream from the plate, the disc extending in the second flow path to a distance less than the plate and providing a space through which the first and second streams pass to be further mixed.

Another embodiment of the FTO apparatus calls for the oxidant being a gas selected from the group consisting of air, oxygen, plant air, unbreathable air, and any combination thereof.

Another embodiment of the method for oxidizing a waste stream having hydrogen therein further includes creating a safety zone where the mixture passes through the ceramic matrix bed; and varying a size and shape of the safety zone responsive to properties of said mixture selected from the group consisting of flow rate of the mixture, concentration of constituents in said mixture, concentration of the hydrogen in said mixture, and combinations thereof.

Another embodiment of the method calls for the oxidant stream including a gas selected from the group consisting of air, oxygen, plant air, unbreathable air, and any combination thereof.

Another embodiment of the method further includes providing a first flow path for the waste stream with the hydrogen; providing a second flow path for the oxidant stream; and introducing at least a portion of the waste stream with the hydrogen into the oxidant stream in the second flow path without exceeding concentration parameters of the LFL and flame speed necessary for flameless oxidation of the mixture.

Another embodiment of the method calls for the introducing being tangential to the oxidant stream in the second flow path.

Another embodiment of the method further includes dispersing the waste stream with the hydrogen into the oxidant stream.

Another embodiment of the method further includes providing rotational turbulence to the waste stream with the hydrogen during the introducing into the oxidant stream.

Another embodiment of the method further includes sealing an end of the first flow path.

Another embodiment of the method further includes preventing the mixture from re-entering the first and second flow paths.

Another embodiment of the method calls for the waste stream with the hydrogen comprising not more than 80% hydrogen mole fraction in the waste stream.

Another embodiment of the method further includes diluting the waste stream having greater than 80% hydrogen mole fraction therein with another gas.

Another embodiment of the method calls for the gas being selected from the group consisting of inert gas, fuel gas, and any combination thereof.

Another embodiment of the method further includes monitoring hydrogen content in the waste stream; and adjusting a temperature of the ceramic matrix bed responsive to the hydrogen content for providing a flameless oxidation reaction zone within the matrix bed.

Waste streams from certain chemical and petrochemical plants contain hydrogen which in the past proved to be a limitation for safe and efficient use of FTO systems. The present FTO apparatus and method embodiments permit same to be used for oxidation of many different effluent streams having up to 80% hydrogen, and to realize the environmental advantages of reducing discharge or emissions of known pollutants into the atmosphere, such as volatile organic compounds (VOCs), oxides of nitrogen (NOx) and carbon monoxide (CO).

The present embodiments can be used in a wide range of chemical processing industries where an effluent stream has to be combusted prior to discharge to the atmosphere. This includes industry processes known as flares which are difficult to control for efficient and environmentally friendly oxidation of gaseous effluent streams, especially during non-emergency operations when discharge quantities are low while typical flares are sized to handle substantially large volumes of gaseous effluent streams. Accordingly, the present embodiments provide an FTO and related process which are also an environmentally beneficial solution for non-emergency flaring of gaseous effluent streams.

It will be understood that the embodiments described herein are merely exemplary, and that a person skilled in the art may make variations and modifications without departing from the spirit and scope of the invention. All such variations and modifications are intended to be included within the scope of the invention as described and claimed herein. It should be understood that the embodiments described above are not only in the alternative, but can be combined.

What is claimed is:

1. A method for oxidizing a waste stream containing hydrogen therein, comprising:
   providing a first flow path for the waste stream containing hydrogen;
   providing a second flow path for the oxidant stream;
   introducing at least a portion of the waste stream containing hydrogen into an oxidant stream for mixing said waste stream and said oxidant stream in proportions to provide a mixture which is below the lower flammability limit of hydrogen to permit flameless oxidation of the mixture and without exceeding concentration parameters of the lower flammability limit and flame speed necessary for flameless oxidation of the mixture; and introducing the mixture into a ceramic matrix bed of a flameless thermal oxidizer maintained at a temperature above auto-ignition temperature of the mixture;

wherein the first and second flow paths are provided within a dip tube assembly that extends into the ceramic matrix bed, and the dip tube assembly comprises an outlet through which the mixture is introduced into the ceramic matrix bed, and the dip tube assembly further comprises a first pipe and a second pipe that extends along the interior of the first pipe, wherein the first pipe provides the second flow path for the oxidant stream and the second pipe provides the first flow path for the waste stream containing hydrogen.

2. The method of claim 1, wherein the oxidant stream comprises air, oxygen, plant air, unbreathable air, or any combination thereof.

3. The method of claim 1, wherein the portion of the waste stream containing hydrogen is introduced tangentially into to the oxidant stream in the second flow path.

4. The method of claim 3, further comprising dispersing the waste stream containing hydrogen into the oxidant stream.

5. The method of claim 3, further comprising providing rotational turbulence to the waste stream containing hydrogen during the introducing into the oxidant stream.

6. The method of claim 1, further comprising sealing an end of the first flow path.

7. The method of claim 1, further comprising preventing the mixture from re-entering the first and second flow paths.

8. The method of claim 1, wherein the waste stream containing hydrogen comprises not more than 80% hydrogen mole fraction in the waste stream.

9. The method of claim 1, wherein the waste stream initially has a hydrogen mole fraction of greater than 80%, and said method further comprises diluting the waste stream having greater than 80% hydrogen mole fraction therein with another gas so that the waste stream has not more than 80% hydrogen mole fraction.

10. The method of claim 9, wherein said another gas is an inert gas, fuel gas, or any combination thereof.

11. The method of claim 1, further comprising:
monitoring hydrogen content in the waste stream; and
adjusting a temperature of the ceramic matrix bed responsive to the hydrogen content the waste stream to provide a flameless oxidation reaction zone within the matrix bed.

12. The method of claim 1, wherein an end of the second pipe is sealed and terminates in a nose cone, the second pipe is further provided with a plurality of openings through which the waste stream containing hydrogen is discharged from the second pipe and introduced and dispersed into the oxidant stream.

13. The method of claim 12, further comprising providing rotational turbulence to the waste stream containing hydrogen during the introducing into the oxidant stream.

14. The method according to claim 12, wherein the dip tube assembly is provided with a plate that circumscribes an exterior surface of the second pipe and is provided with a mixing orifice for mixing the waste stream and the oxidant stream.

15. The method according to claim 14, wherein the dip tube assembly is further provided with a mixing disc which circumscribes an exterior surface of the pipe but does not extend radially to an extent sufficient to block the first pipe, wherein the mixing disc facilitates mixing of the waste stream and the oxidant stream.

* * * * *